United States Patent
Ooe et al.

(10) Patent No.: US 12,085,514 B2
(45) Date of Patent: Sep. 10, 2024

(54) INSPECTION DEVICE AND COATING APPARATUS EQUIPPED WITH THE SAME

(71) Applicant: Daifuku Co., Ltd., Osaka (JP)

(72) Inventors: Masahiro Ooe, Hinocho (JP); Shuei Seno, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 295 days.

(21) Appl. No.: 17/854,069

(22) Filed: Jun. 30, 2022

(65) Prior Publication Data
US 2023/0003666 A1    Jan. 5, 2023

(30) Foreign Application Priority Data
Jul. 1, 2021  (JP) .................. 2021-110027

(51) Int. Cl.
*G01N 21/95* (2006.01)
*G01N 21/88* (2006.01)

(52) U.S. Cl.
CPC ..... *G01N 21/95* (2013.01); *G01N 2021/8812* (2013.01); *G01N 2021/8887* (2013.01)

(58) Field of Classification Search
CPC .......... G01N 21/95; G01N 2021/8812; G01N 2021/8887
See application file for complete search history.

(56) References Cited

U.S. PATENT DOCUMENTS
2020/0368770 A1 *  11/2020  Ooe .................. B25J 13/089

FOREIGN PATENT DOCUMENTS
JP       2020189354 A     11/2020

* cited by examiner

*Primary Examiner* — Jamil Ahmed
(74) *Attorney, Agent, or Firm* — The Webb Law Firm

(57) ABSTRACT

An inspection device for inspecting a state of a coating agent applied to a target surface having a protruding portion includes: an image capture device configured to capture an image of a predetermined inspection target region of the target surface; and an illumination device configured to emit light possible to be captured by the image capture device, toward the inspection target region, wherein the illumination device includes: a first light source configured to emit diffuse light toward an entirety of the inspection target region; and a second light source configured to emit direct light toward a shadow that is cast by the protruding portion due to emission of the diffuse light by the first light source.

8 Claims, 3 Drawing Sheets

INSPECTION DEVICE AND COATING APPARATUS EQUIPPED WITH THE SAME

CROSS-REFERENCE TO RELATED APPLICATION

This application claims priority to Japanese Patent Application No. 2021-110027 filed Jul. 1, 2021, the disclosure of which is hereby incorporated by reference in its entirety.

BACKGROUND OF THE INVENTION

1. Field of the Invention

The present invention relates to an inspection device for inspecting the state of a coating agent applied to a target surface with an uneven portion, and a coating apparatus equipped with the same.

2. Description of the Related Art

JP 2020-189354A (hereinafter, "Patent Document 1") discloses an example of this type of technology. The following description of background art will cite reference signs in Patent Document 1 in parentheses.

Patent Document 1 discloses a technique for causing an application unit (20) to apply a coating agent to a target surface (91), causing an image capture device (40) to capture an image of the coating agent applied to the target surface (91), and inspecting the state of the coating agent based on the thus captured image.

In this type of inspection, the image capture device (40) captures an image while an illumination device emits light toward the coating agent applied to the target surface (91). If it is detected that a shadow is cast on the surface of the coating agent based on the captured image, it is determined that the surface of the coating agent is uneven and the coating agent has not been appropriately applied to the target surface (91).

SUMMARY OF THE INVENTION

If the target surface has an uneven portion, such as a welded portion or a joint between members, a shadow may be cast on the surface of the coating agent due to the uneven portion. For this reason, a technique such as that described above may lead to an erroneous determination that a failure has occurred in the application of the coating agent even though the coating agent was appropriately applied to the target surface.

There is, therefore, a desire for a technique that enables appropriate inspection of the state of a coating agent applied to a target surface even if the target surface has an uneven portion.

In view of the foregoing, a characteristic configuration of an inspection device lies in that an inspection device for inspecting a state of a coating agent applied to a target surface having an uneven portion includes:

an image capture device configured to capture an image of a predetermined inspection target region of the target surface; and an illumination device configured to emit light possible to be captured by the image capture device, toward the inspection target region, wherein the illumination device includes:

a first light source configured to emit diffuse light toward an entirety of the inspection target region; and a second light source configured to emit direct light toward a shadow that is cast by the uneven portion due to emission of the diffuse light by the first light source.

According to this characteristic configuration, the first light source emits diffuse light toward the entire inspection target region of the target surface with the coating agent applied thereto. The second light source emits direct light to the shadow that is cast by the uneven portion of the target surface due to the emission of diffuse light. This reduces the shadow that is cast by the uneven portion of the target surface due to the emission of diffuse light by the first light source. It is, therefore, possible to reduce the likelihood of erroneously determining that a failure has occurred in the application of the coating agent despite the coating agent having been appropriately applied to the target surface. Accordingly, the state of the coating agent applied to the target surface can be appropriately inspected even if the target surface has an uneven portion.

DETAILED DESCRIPTION OF PREFERRED EMBODIMENTS

A coating apparatus 100 according to the embodiment is described below with reference to the drawings. The coating apparatus 100 includes an application unit 1, a drive unit 2, and an inspection device 3, as shown in FIG. 1.

Figure 2:
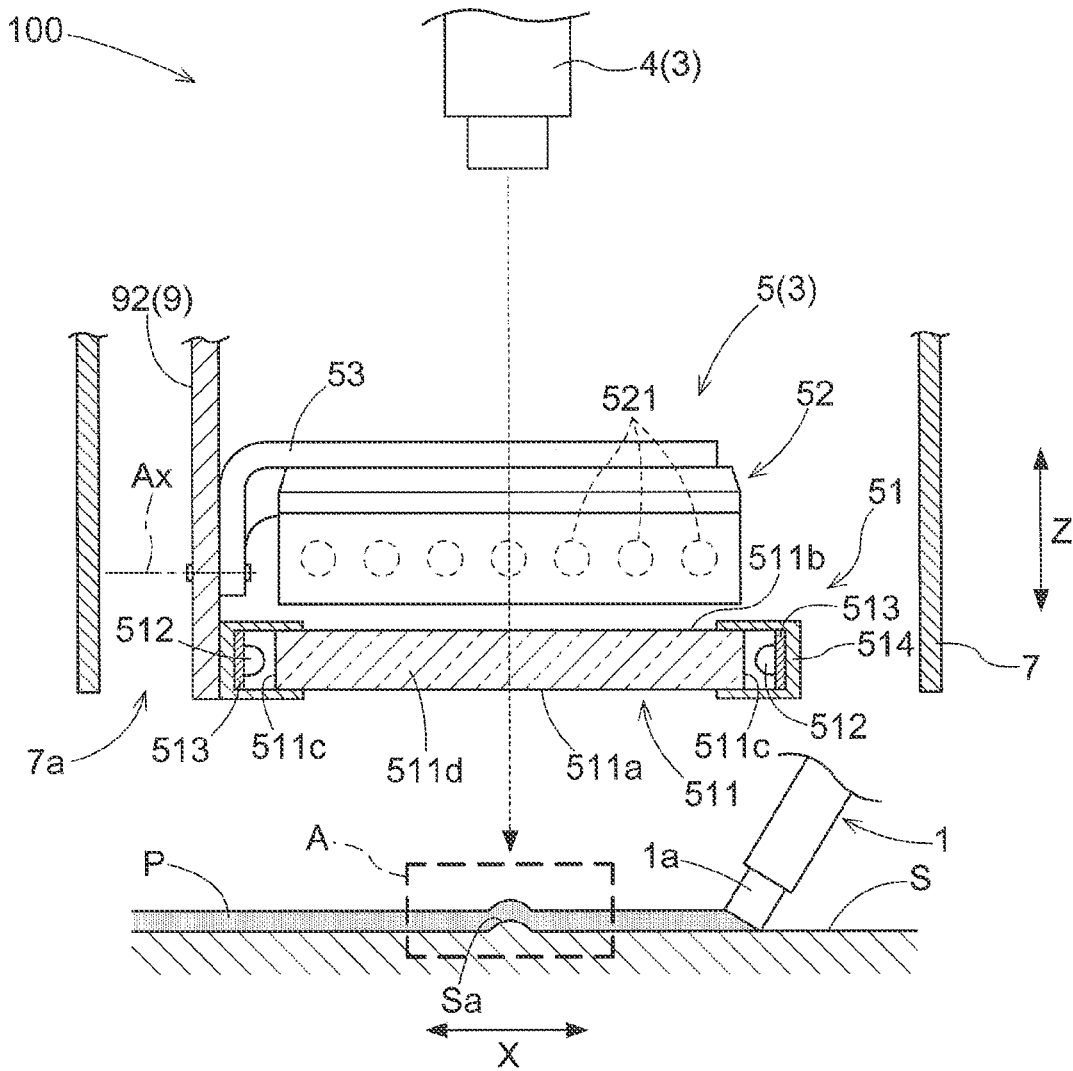
FIG. 2 is a cross-sectional view of a main part of the inspection device and the coating apparatus equipped with the same according to the embodiment.

The application unit 1 is configured to apply a coating agent P to a target surface S, as shown in FIG. 2. The application unit 1 in the present embodiment includes a brush 1a for applying the coating agent P to the target surface S. The target surface S in this example is a surface of a vehicle body of an automobile to which a glass panel is to be attached. The coating agent P is a primer that is interposed between the vehicle body and an adhesive and between the glass panel and the adhesive in the case where an adhesive is used to adhere the glass panel to the body of the automobile.

The target surface S in the present embodiment has a flat plate shape. The target surface S includes a protruding portion Sa, which is a raised portion of the target surface S. Therefore, a portion of the coating agent P applied to the target surface S that is located on the protruding portion Sa is also raised. The protruding portion Sa corresponds to an "uneven portion" of the target surface S.

Figure 1:
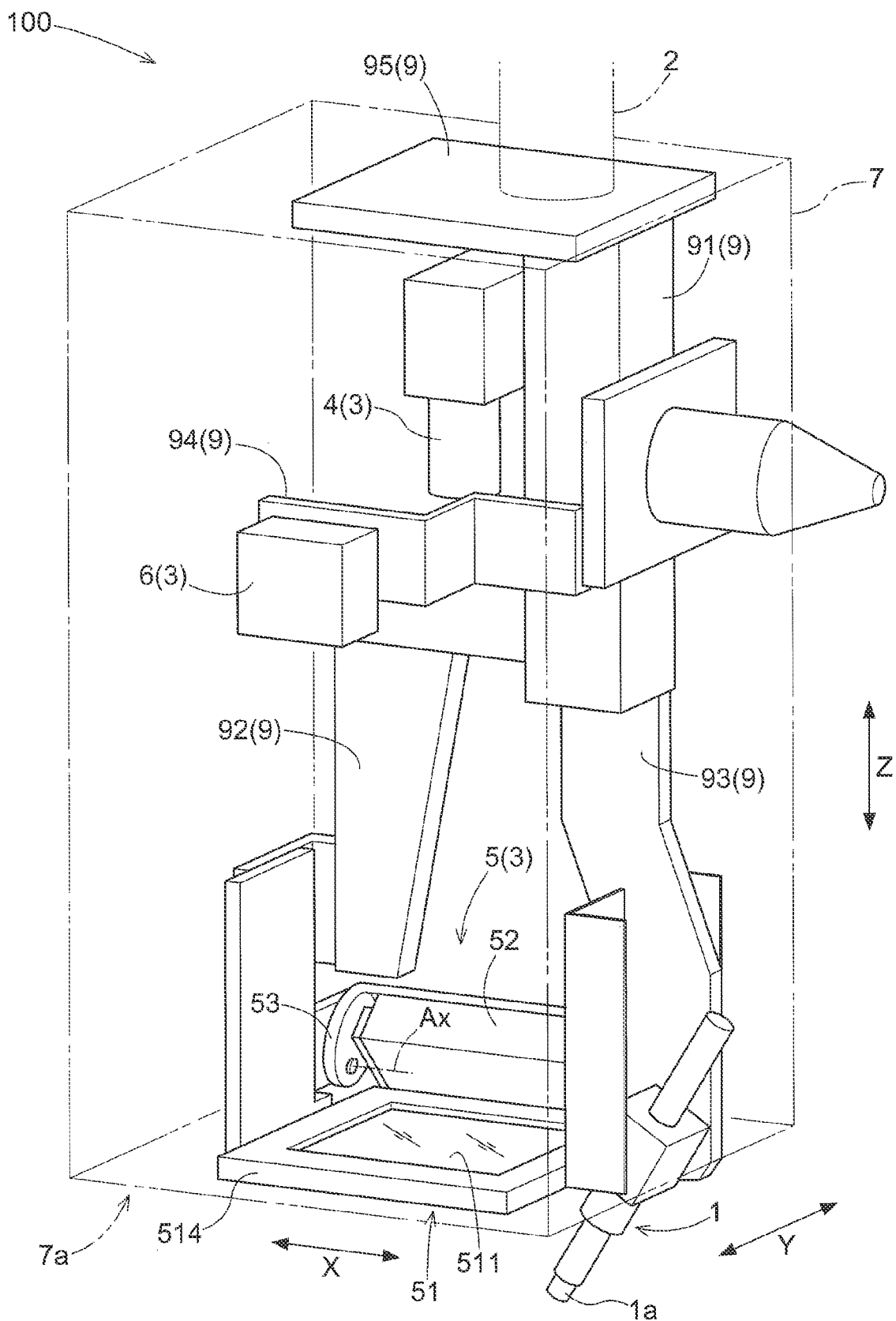
FIG. 1 is a perspective view of an inspection device and a coating apparatus equipped with the same according to an embodiment.

The drive unit 2 moves the application unit 1, as shown in FIG. 1. The drive unit 2 also moves the inspection device 3 together with the application unit 1. The drive unit 2 in this example is a robot arm.

The drive unit 2 in the present embodiment moves a support member 9 in a first direction X, a second direction Y, and a third direction Z. The first direction X, the second direction Y, and the third direction Z are directions that are orthogonal to each other. The first direction X and the second direction Y in the present embodiment are directions in which the target surface S expands. The third direction Z is a direction of moving close to and away from the target surface S.

The inspection device 3 is a device that inspects the state of the coating agent P applied to the target surface S. The inspection device 3 includes an image capture device 4 and an illumination device 5. The inspection device 3 in the present embodiment also includes a distance measuring device 6 and a housing 7.

The image capture device 4 is a device that captures an image of a predetermined inspection target region A of the target surface S. The image capture device 4 in the present embodiment is located at a position at which the inspection target region A includes a region of the target surface S to which the application unit 1 has applied the coating agent P. The image capture device 4 in this example is a camera that captures an image of the inspection target region A and obtains a captured image IM (see FIG. 4). The captured image IM corresponds to "information" that is acquired by the image capture device 4 capturing an image of the inspection target region A.

The illumination device 5 is a device that emits light possible to be captured by the image capture device 4, toward the inspection target region A. Here, "light possible to be captured by the image capture device 4" is not limited to visible light, and also includes infrared rays, ultraviolet rays, or the like.

The distance measuring device 6 is a device that measures the distance to the target surface S, as shown in FIG. 1. The distance measuring device 6 in this example is a laser distance meter.

The housing 7 accommodates the image capture device 4 and the illumination device 5 with the relative position of the housing 7 with respect to the image capture device 4 and the illumination device 5 being fixed. The housing 7 includes an opening 7a that extends through the housing 7. The opening 7a in the present embodiment passes through a surface of the housing 7 that faces the target surface S in the third direction Z.

The housing 7 in the present embodiment accommodates the distance measuring device 6 and the application unit 1 with the relative position of the housing 7 with respect to the distance measuring device 6 and the application unit 1 being fixed. Note that the application unit 1 is accommodated in the housing 7 with the brush 1a being exposed from the opening 7a to the outside of the housing 7.

The application unit 1 and the inspection device 3 in the present embodiment are supported by the support member 9 with the relative positions of the application unit 1 and the inspection device 3 with respect to each other being fixed. The drive unit 2 integrally moves the application unit 1 and the inspection device 3 by moving the support member 9.

The support member 9 in the present embodiment includes a first support 91 that supports the image capture device 4, a second support 92 that supports the illumination device 5, a third support 93 that supports the application unit 1, a fourth support 94 that supports the distance measuring device 6, and a joint 95 that is joined to the drive unit 2.

The first support 91 extends in the third direction Z from the joint 95 toward the target surface S. The image capture device 4 is attached to a face of the first support 91 that faces the first direction X. The second support 92 extends in the first direction X from the first support 91, and then extends in the third direction Z toward the target surface S. The illumination device 5 is attached to a leading end portion (end portion on the target surface S side) of the second support 92. The third support 93 extends in the third direction Z from the first support 91 toward the target surface S, while being separated from the second support 92 in the first direction X. The application unit 1 is attached to a leading end portion (end portion on the target surface S side) of the third support 93.

Figure 3:
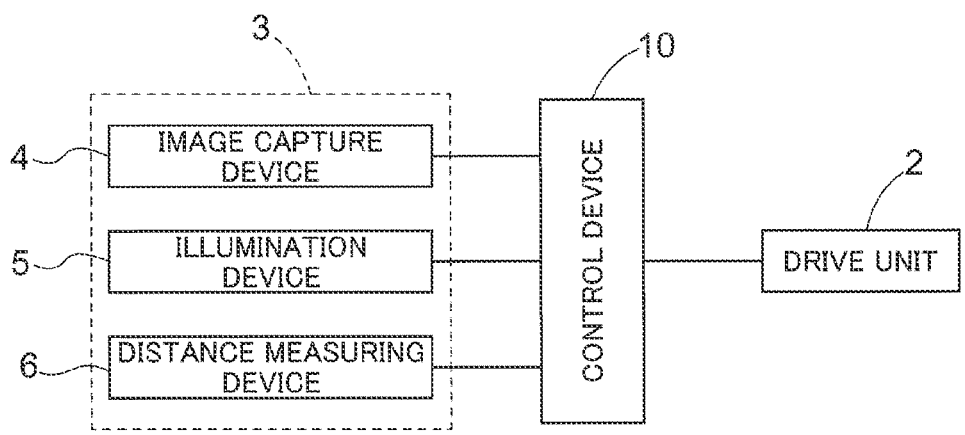
FIG. 3 is a control block diagram of the coating apparatus according to the embodiment.

The coating apparatus 100 in the present embodiment also includes a control device 10, as shown in FIG. 3. The control device 10 controls the drive unit 2. The control device 10 in the present embodiment also controls the image capture device 4, the illumination device 5, and the distance measuring device 6 of the inspection device 3.

The control device 10 in the present embodiment determines whether or not the coating agent P has been appropriately applied to the target surface S based on a captured image IM acquired by the image capture device 4. The control device 10 in this example creates a grayscale image by grayscaling the captured image IM, and determines that a shadow has occurred due to a failure in the application of the coating agent P if the change rate of grayscale in the grayscale image takes a value that is greater than or equal to a predetermined threshold.

The control device 10 in the present embodiment also performs position correction control to correct the relative position of the application unit 1 with respect to the target surface S, based on the captured image IM acquired by the image capture device 4. The control device 10 in this example calculates the relative position of the inspection device 3 with respect to the current target surface S, based on the captured image IM. Here, a movement path of the drive unit 2 is preset through teaching, for example, and the appropriate relative position of the inspection device 3 with respect to the target surface S is set. For this reason, the control device 10 in this example controls the drive unit 2 through the position correction control such that the relative position of the inspection device 3 with respect to the current target surface S is the preset relative position. It is preferable that the position correction control is performed based on the distance to the target surface S that is measured by the distance measuring device 6 in addition to the captured image IM. The position correction control can thus be performed with increased precision.

The illumination device 5 includes a first light source 51 and a second light source 52, as shown in FIG. 2.

The first light source 51 emits diffuse light toward the entire inspection target region A. In the present embodiment, a shadow is cast by the protruding portion Sa as a result of the first light source 51 emitting diffuse light toward the inspection target region A that includes the protruding portion Sa (see the area surrounded by a broken line in the left diagram in FIG. 4). The first light source 51 in the present embodiment includes a light guiding plate 511 and a plurality of light-emitting units 512.

The light guiding plate 511 is made of a translucent material. The light guiding plate 511 has a flat plate shape. The light guiding plate 511 in the present embodiment has an emission face 511a that faces the target surface S in the third direction Z, a diffusion face 511b that faces the opposite side to the emission face 511a in the third direction Z, a pair of first incident faces 511c that face respective sides in the first direction X, and a pair of second incident faces 511d that face respective sides in the second direction Y. The emission face 511a and the diffusion face 511b in the present embodiment each have a rectangular shape that has a pair of sides extending in the first direction X and a pair of sides extending in the second direction Y. The pair of first incident faces 511c connect the pair of sides of the emission face 511a that extend in the second direction Y to the pair of sides of the diffusion face 511b that extend in the second direction Y. The pair of second incident faces 511d connect the pair of sides of the emission face 511a that extend in the first direction X to the pair of sides of the diffusion face 511b that extend in the first direction X.

The plurality of first light-emitting units 512 are located around the light guiding plate 511 and emit light toward the light guiding plate 511. Although not shown in the figures, the plurality of first light-emitting units 512 in the present embodiment are arranged in a line in the second direction Y to face the pair of first incident faces 511c of the light guiding plate 511, and are also arranged in a line in the first direction X to face the pair of second incident faces 511d of the light guiding plate 511. Further, the plurality of first light-emitting units 512 in the present embodiment emit light toward the pair of first incident faces 511c and the pair of second incident faces 511d of the light guiding plate 511. The plurality of first light-emitting units 512 in this example are light-emitting diodes attached to a substrate 513.

The light guiding plate 511 diffuses light from the plurality of first light-emitting units 512 toward the inspection target region A. The diffusion face 511b of the light guiding plate 511 in the present embodiment has a plurality of diffusing elements (not shown), such as protruding portions or groove portions. These diffusing elements diffuse incident light from the plurality of first light-emitting units 512 from the pair of first incident faces 511c and the pair of second incident faces 511d, and cause the incident light to be emitted from the emission face 511a.

The light guiding plate 511 in the present embodiment overlaps the brush 1a of the application unit 1 as viewed in a direction parallel to the third direction Z. The application unit 1 in this example is inclined relative to the third direction Z such that the brush 1a of the application unit 1 overlaps the light guiding plate 511 as viewed in a direction parallel to the third direction Z. Here, regarding the arrangement of two elements, "overlapping as viewed in a specific direction" means that when a virtual straight line parallel to the line-of-sight direction moves in a direction orthogonal to this virtual straight line, a region where the virtual straight line intersects both of the two elements exists at least partially.

The light guiding plate 511 and the plurality of first light-emitting units 512 in the present embodiment are supported by a frame member 514. The frame member 514 accommodates the plurality of first light-emitting units 512. The frame member 514 in the present embodiment covers the outer edges of the emission face 511a and the diffusion face 511b of the light guiding plate 511. Further, the frame member 514 holds the substrate 513 to which the first light-emitting units 512, which are light-emitting diodes, are attached. In addition, the frame member 514 in the present embodiment is fixed to the second support 92 while being located between the second support 92 and the third support 93 of the support member 9 in the first direction X (see FIG. 1).

Figure 4:
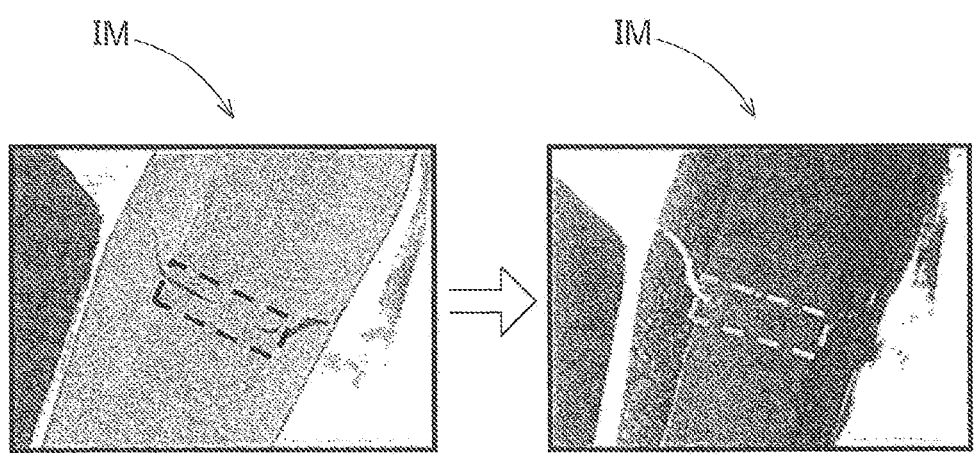
FIG. 4 shows a captured image of an inspection target region that includes an uneven portion in a target surface that is captured with a first light source emitting diffuse light, and a captured image that is captured with the first light source emitting diffuse light and a second light source emitting direct light.

The second light source 52 emits direct light toward a shadow that is cast by the uneven portion of the target surface S due to the emission of diffuse light by the first light source 51. As a result of the second light source 52 emitting direct light toward the shadow that is cast by the uneven portion of the target surface S due to the emission of diffuse light by the first light source 51 (see the area surrounded by a broken line in the left diagram in FIG. 4), the shadow is reduced (see the area surrounded by a broken line in the right diagram in FIG. 4), as shown in FIG. 4. In the example shown in FIG. 4, a step portion is present as the uneven portion at a boundary between two members located next to each other. Note that the position and the orientation of the shadow that is cast by the uneven portion (e.g., the protruding portion Sa, the step portion shown in FIG. 4) of the target surface S due to the emission of diffuse light by the first light source 51 can be perceived in advance by means of teaching, experimentation, or the like for setting the movement path or the like of the drive unit 2, for example.

The second light source 52 in the present embodiment includes a plurality of second light-emitting units 521, as shown in FIG. 2. The plurality of second light-emitting units 521 emit light toward the inspection target region A. The plurality of second light-emitting units 521 are in a linear arrangement. The plurality of second light-emitting units 521 in the present embodiment are in a line in the first direction X. The plurality of second light-emitting units 521 in this example are light-emitting diodes.

In the present embodiment, the second light source 52 can change the direction in which direct light is emitted. More specifically, the second light source 52 can change the direction in which direct light is emitted, relative to the direction in which the image capture device 4 captures an image. In this example, the second support 92 of the support member 9 supports a holder 53, which holds the second light source 52, such that the holder 53 can rotate about an axis Ax that is parallel to the first direction X. Note that the control device 10 controls the rotation of the holder 53 in this example. Here, it is preferable that the direction in which the second light source 52 emits direct light is set to be parallel to a direction orthogonal to, or almost orthogonal to, the region of the target surface S in which a shadow is cast due to the emission of diffuse light by the first light source 51. It is preferable that, if the region where a shadow is cast is a curved surface, the direction in which the second light source 52 emits direct light is set to be parallel to a direction orthogonal to, or almost orthogonal to, the center region of the shadow. The control device 10 controls the angle of the holder 53 such that the direction in which the second light source 52 emits direct light is as close as possible to a direction orthogonal to the region where a shadow is cast due to the emission of diffuse light by the first light source 51.

In the present embodiment, the direct light illuminance, namely the illuminance of direct light emitted by the second light source 52 is set in accordance with the uneven portion (e.g., the protruding portion Sa, the step portion shown in FIG. 4) of the target surface S. Further, the diffuse light illuminance, namely the illuminance of diffuse light emitted by the first light source 51, is set in accordance with the direct light illuminance. The direct light illuminance is set based on the height (the dimension in the third direction Z) and/or the widths (the dimensions in the first direction X and the second direction Y) of the protruding portion Sa, for example. The diffuse light illuminance is set to a value that is smaller than the value of the direct light illuminance, for example. Note that the control device 10 changes the direct light illuminance and the diffuse light illuminance in this example. Note that the direct light illuminance and the diffuse light illuminance are set within a range in which lens flare does not occur in the image capture device 4.

The second light source 52 in the present embodiment is located at a position that allows the second light source 52 to emit light from the plurality of second light-emitting units 521 toward the inspection target region A through the light guiding plate 511. Accordingly, light from the plurality of second light-emitting units 521 is incident on the light guiding plate 511 from the diffusion face 511b, passes through the light guiding plate 511, and is emitted from the emission face 511a toward the inspection target region A.

The image capture device 4 in the present embodiment is located at a position that allows the image capture device 4 to capture an image of the inspection target region A through the light guiding plate 511. The image capture device 4 in this example faces the diffusion face 511b of the light guiding plate 511 in the third direction Z. In other words, the image capture device 4 overlaps the light guiding plate 511 as viewed in a direction parallel to the third direction Z.

The first light source 51 in the present embodiment covers at least a portion of the opening 7a in the housing 7. The light guiding plate 511 of the first light source 51 in this example covers at least a portion of the opening 7a in the housing 7.

As mentioned above, the image capture device 4 in the present embodiment is located at a position that allows the image capture device 4 to capture an image of the inspection target region A through the light guiding plate 511. The first light source 51 covers at least a portion of the opening 7a in the housing 7. Therefore, the image capture device 4 in the present embodiment is located at a position that allows the image capture device 4 to capture an image of the inspection target region A through the opening 7a in the housing 7. In addition, the second light source 52 in the present embodiment is located at a position that allows the second light source 52 to emit light from the plurality of second light-emitting units 521 toward the inspection target region A through the light guiding plate 511, as mentioned above. Therefore, the second light source 52 in the present embodiment is located at a position that allows the second light source 52 to emit direct light toward the inspection target region A through the opening 7a in the housing 7.

Other Embodiments (1) The above embodiment described an example of a configuration in which the target surface S has, as an uneven portion, a protruding portion Sa that is a raised portion of the target surface S. However, there is no limitation to this example. The uneven portion of the target surface S may alternatively be a recessed portion that is a recessed portion of the target surface S, or may have an uneven shape that is a combination of such recessed and protruding portions.

(2) The above embodiment described an example of a configuration in which the direct light illuminance, namely the illuminance of direct light emitted by the second light source 52, is set in accordance with the uneven portion (e.g., the protruding portion Sa, the step portion shown in FIG. 4) of the target surface S. However, there is no limitation to this configuration. For example, the direct light illuminance may alternatively be set in accordance with the color of the target surface S. It is preferable in this configuration that the direct light illuminance is increased if the lightness of the target surface S is low, and the direct light illuminance is reduced if the lightness of the target surface S is high, for example.

(3) The above embodiment described an example of a configuration in which the second light source 52 can change the direction in which direct light is emitted. However, there is no limitation to this configuration. The direction in which direct light is emitted may alternatively be fixed. For example, in the configuration of the above embodiment, the direction in which the second light source 52 emits direct light may be fixed relative to the direction in which the image capture device 4 captures an image.

(4) The above embodiment described an example of a configuration that includes the housing 7. However, there is no limitation to this configuration. A configuration without a housing 7 may alternatively be employed.

(5) The above embodiment described an example of a configuration in which the first light source 51 includes a translucent light guiding plate 511 with a flat plate shape, and a plurality of first light-emitting units 512 located around the light guiding plate 511 in such a manner as to emit light toward the light guiding plate 511. However, there is no limitation to this configuration. For example, the first light source 51 may alternatively be a dome light that includes a dome-shaped case and a plurality of light-emitting units that are located within the case and emit light inward of the case.

(6) The above embodiment described an example of a configuration in which the second light source 52 includes a plurality of second light-emitting units 521 that are in a linear arrangement. However, there is no limitation to this configuration. For example, the plurality of second light-emitting units 521 may alternatively be in an annular arrangement. Alternatively, the second light source 52 may alternatively include only one second light-emitting unit 521.

(7) The above embodiment described an example of a configuration in which the second light source 52 is located at a position that allows the second light source 52 to emit light from the plurality of second light-emitting units 521 through the light guiding plate 511 toward the inspection target region A. However, there is no limitation to this configuration. The second light source 52 may alternatively be located at a position that allows the second light source 52 to emit light from the plurality of second light-emitting units 521 toward the inspection target region A without emitting light through the light guiding plate 511.

(8) The above embodiment described an example of a configuration in which the image capture device 4 is located at a position that allows the image capture device 4 to capture an image of the inspection target region A through the light guiding plate 511. However, there is no limitation to this configuration. The image capture device 4 may alternatively be located at a position that allows the image capture device 4 to capture an image of the inspection target region A without capturing an image through the light guiding plate 511.

(9) The above embodiment described an example of a configuration in which the control device 10 performs position correction control to correct the relative position of the application unit 1 with respect to the target surface S, based on the captured image IM acquired by the image capture device 4. The position correction control may be performed only once before the application unit 1 performs the step of applying the coating agent P, or may be performed multiple times during this step. Alternatively, the control device 10 need not perform the position correction control.

(10) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made, as appropriate, without departing from the gist of the present disclosure.

Summary of the Above Embodiment

The summary of the above-described inspection device and coating apparatus will be described below.

The inspection device is
an inspection device for inspecting a state of a coating agent applied to a target surface having an uneven portion, the inspection device including:
an image capture device configured to capture an image of a predetermined inspection target region of the target surface; and
an illumination device configured to emit light possible to be captured by the image capture device, toward the inspection target region,
wherein the illumination device includes:
  a first light source configured to emit diffuse light toward an entirety of the inspection target region; and
  a second light source configured to emit direct light toward a shadow that is cast by the uneven portion due to emission of the diffuse light by the first light source.

According to this configuration, the first light source emits diffuse light toward the entire inspection target region of the target surface with the coating agent applied thereto. The second light source then emits direct light toward a shadow that is cast by the uneven portion of the target surface due to the emission of diffuse light. This reduces the shadow that is cast by the uneven portion of the target surface due to the emission of diffuse light by the first light source. Thus, it is possible to reduce the likelihood of an erroneous determination indicating that a failure has occurred in the application of the coating agent despite the coating agent having been appropriately applied to the target surface. Accordingly, the state of the coating agent applied to the target surface can be appropriately inspected even if the target surface has an uneven portion.

Here, it is preferable that the direct light emitted by the second light source has a direct light illuminance that is determined in accordance with the uneven portion, and
  the diffuse light emitted by the first light source has an illuminance that is determined in accordance with the direct light illuminance.

According to this configuration, an appropriate lightness for image capture by the image capture device can be set in the inspection target region. Accordingly, the state of the coating agent applied to the target surface can be accurately inspected.

It is preferable that the second light source is capable of changing a direction in which the direct light is emitted.

According to this configuration, the second light source can appropriately emit direct light in accordance with the orientation of a shadow that is cast by the uneven portion of the target surface due to the emission of diffuse light by the first light source. Accordingly, it is possible to appropriately reduce the shadow that is cast by the uneven portion of the target surface due to the emission of diffuse light, regardless of the direction of the shadow.

It is preferable that the inspection device further includes a housing accommodating the image capture device and the illumination device with a relative position of the housing with respect to the image capture device and the illumination device being fixed,
  wherein the housing includes an opening extending through the housing,
  the image capture device is located at a position that allows the image capture device to capture the image of the inspection target region through the opening,
  the first light source covers at least a portion of the opening, and
  the second light source is located at a position that allows the second light source to emit the direct light toward the inspection target region through the opening.

According to this configuration, the image capture device and the illumination device are accommodated in the housing. This reduces the influence of ambient light on the image capture device. Further, the inspection target region can be easily covered by the housing when the image capture device captures an image of the inspection target region. This reduces the influence of ambient light on the inspection target region.

In addition, this configuration enables the first light source for emitting diffuse light toward the inspection target region to be brought closer to the inspection target region than the second light source for emitting direct light toward the inspection target region. Thus, the inspection target region can easily be set in an appropriate state for image capture by the image capture device.

It is preferable that the second light source includes a plurality of second light-emitting units in a linear arrangement,
  the first light source includes:
    a light guiding plate that is translucent and has a flat plate shape; and
    a plurality of first light-emitting units located around the light guiding plate and configured to emit light toward the light guiding plate, and
  the light guiding plate is configured to diffuse the light from the plurality of first light-emitting units toward the inspection target region.

According to this configuration, the first light source includes a light guiding plate having a flat plate shape, and a plurality of first light-emitting units located around the light guiding plate. This keeps the arrangement space for the first light source small since the first light source can be formed to have a flat plate shape as a whole. Accordingly, the inspection device can easily be reduced in size.

According to this configuration, the second light source includes a plurality of second light-emitting units in a linear arrangement. This makes it easier to increase the size of the region to which the second light source emits direct light. Accordingly, direct light can be appropriately emitted to the shadow that is cast by the uneven portion of the target surface even if this shadow is relatively large.

It is preferable that the second light source is located at a position that allows the second light source to emit the light from the plurality of second light-emitting units toward the inspection target region through the light guiding plate, and
  the image capture device is located at a position that allows the image capture device to capture the image of the inspection target region through the light guiding plate.

According to this configuration, light from the plurality of second light-emitting units is emitted through the light guiding plate to the inspection target region, and light from the plurality of first light-emitting units is diffused toward the inspection target region by the light guiding plate. This enables diffuse light of the first light source and direct light of the second light source to be appropriately emitted toward the inspection target region.

According to this configuration, the image capture device captures an image of the inspection target region through the light guiding plate. This enables the image capture device to easily capture an image from a direction orthogonal to the inspection target region. Accordingly, an image of the inspection target region can be captured appropriately.

The coating apparatus is
a coating apparatus including:
the inspection device according to any one of the above items;
an application unit configured to apply the coating agent to the target surface; and
a drive unit configured to move the application unit,
wherein the drive unit is configured to move the inspection device together with the application unit, and
the image capture device is located at a position at which the inspection target region includes a region of the target surface to which the coating agent has been applied by the application unit.

According to this configuration, the inspection device can be easily moved in conjunction with the application unit. This enables the inspection device to start inspecting the state of the coating agent immediately after the application unit has applied the coating agent to the target surface. Accordingly, operation time of the coating apparatus can be shortened.

Here, it is preferable that the coating apparatus further includes:
a control device configured to control the drive unit,
wherein the control device performs position correction control to correct a relative position of the application unit with respect to the target surface, based on information acquired by the image capture device capturing the image of the inspection target region.

According to this configuration, the image capture device of the inspection device can also be used in position correction for the application unit, in addition to the inspection of the state of the coating agent applied to the target surface. Accordingly, it is possible to simplify the configuration of the coating apparatus and reduce the cost thereof, compared with a configuration in which an image capture device for correcting the position of the application unit is separately provided.

INDUSTRIAL APPLICABILITY

The technique according to the present disclosure can be used in an inspection device for inspecting the state of a coating agent applied to a target surface with an uneven portion, and a coating apparatus that includes the same.

What is claimed is:

1. An inspection device for inspecting a state of a coating agent applied to a target surface having an uneven portion, the inspection device comprising:
an image capture device configured to capture an image of a predetermined inspection target region of the target surface; and
an illumination device configured to emit light capturable by the image capture device, toward the inspection target region,
wherein the illumination device comprises:
a first light source configured to emit diffuse light toward an entirety of the inspection target region; and
a second light source configured to emit direct light toward a shadow that is cast by the uneven portion due to emission of the diffuse light by the first light source.

2. The inspection device according to claim 1,
wherein the direct light emitted by the second light source has a direct light illuminance that is determined in accordance with the uneven portion, and
wherein the diffuse light emitted by the first light source has an illuminance that is determined in accordance with the direct light illuminance.

3. The inspection device according to claim 1,
wherein the second light source is capable of changing a direction in which the direct light is emitted.

4. The inspection device according to claim 1, further comprising:
a housing accommodating the image capture device and the illumination device with a relative position of the housing with respect to the image capture device and the illumination device is fixed,
wherein:
the housing includes an opening extending through the housing,
the image capture device is located at a position that allows the image capture device to capture the image of the inspection target region through the opening,
the first light source covers at least a portion of the opening, and
the second light source is located at a position that allows the second light source to emit the direct light toward the inspection target region through the opening.

5. The inspection device according to claim 1,
wherein the second light source comprises a plurality of second light-emitting units in a linear arrangement,
wherein the first light source comprises:
a light guiding plate that is translucent and has a flat plate shape; and
a plurality of first light-emitting units located around the light guiding plate and configured to emit light toward the light guiding plate, and
wherein the light guiding plate is configured to diffuse the light from the plurality of first light-emitting units toward the inspection target region.

6. The inspection device according to claim 5,
wherein the second light source is located at a position that allows the second light source to emit the light from the plurality of second light-emitting units toward the inspection target region through the light guiding plate, and
wherein the image capture device is located at a position that allows the image capture device to capture the image of the inspection target region through the light guiding plate.

7. A coating apparatus comprising:
the inspection device according to claim 1;
an application unit configured to apply the coating agent to the target surface; and
a drive unit configured to move the application unit,
wherein the drive unit is configured to move the inspection device together with the application unit, and
wherein the image capture device is located at a position at which the inspection target region includes a region of the target surface to which the coating agent has been applied by the application unit.

8. The coating apparatus according to claim 7, further comprising:
a control device configured to control the drive unit, and wherein the control device performs position correction control to correct a relative position of the application unit with respect to the target surface, based on information acquired by the image capture device capturing the image of the inspection target region.

* * * * *